(No Model.)
J. HABEL.
LEVEL.
No. 523,205. Patented July 17, 1894.
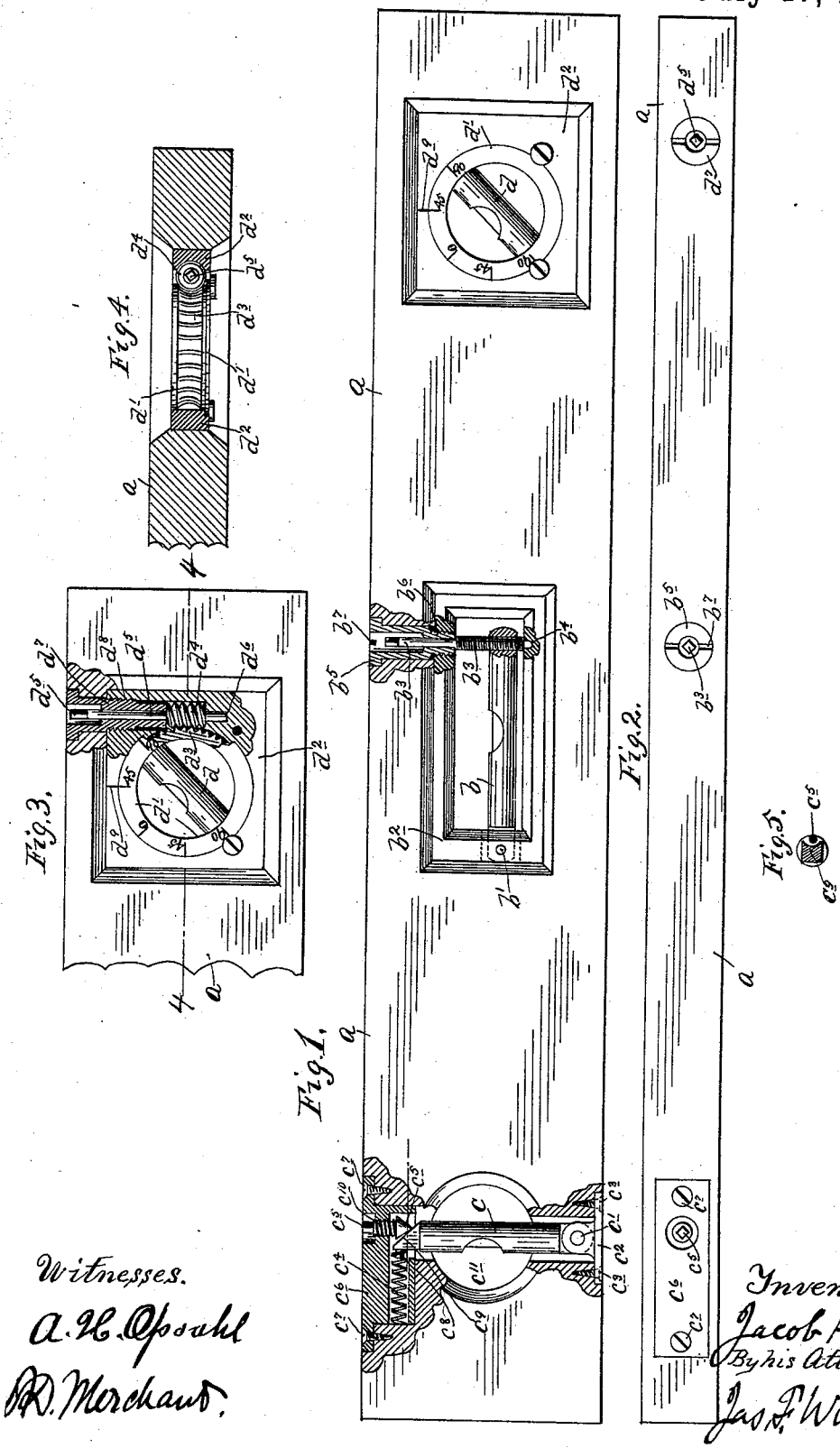
Witnesses.
A. H. Opsahl
R. Merchant
Inventor:
Jacob Habel
By his Attorney.
Jas. F. Williamson

UNITED STATES PATENT OFFICE.

JACOB HABEL, OF MINNEAPOLIS, MINNESOTA.

LEVEL.

SPECIFICATION forming part of Letters Patent No. 523,205, dated July 17, 1894.

Application filed February 9, 1894. Serial No. 499,574. (No model.)

*To all whom it may concern:*

Be it known that I, JACOB HABEL, a citizen of the United States, residing at Minneapolis, in the county of Hennepin and State of Minnesota, have invented certain new and useful Improvements in Levels; and I do hereby declare the following to be a full, clear, and exact description of the invention, such as will enable others skilled in the art to which it appertains to make and use the same.

My invention has for its object to provide an improved level, for use by artisans and others, such as masons, carpenters, &c.

To this end, the invention consists of certain novel devices and combinations of devices, which will be hereinafter fully described and defined in the claims.

In the accompanying drawings, like letters referring to like parts,—Figure 1 is a side elevation of my improved level, with some parts broken away, and others shown in section. Fig. 2 is a plan view of the level. Fig. 3 is a detail, partly in side elevation and partly in vertical section, with some parts broken away, showing the construction and mounting of the tube, which I employ for measuring and indicating angular projections. Fig. 4 is a detail in cross section, on the line 4—4 of Fig. 3; and Fig. 5 is a detail showing the concave face of the plumb line bubble tube.

$a$ represents the body or stock of the level, which may be of any suitable construction. $b$ represents the horizontal leveling tube, pivoted at one end, as shown at $b'$ to a rectangular open frame $b^2$, which is centrally mounted in the body of the level. The other end of the tube $b$ is adjustably supported by a wrench-headed rod $b^3$ having a screw-threaded engagement with the tube, and working with its lower end against a suitable seat $b^4$ in the frame $b^2$ and with its upper end held against upward longitudinal movement in a counterbored nut $b^5$, resting in a countersunk seat in the body of the level and having screw-threaded engagement at its lower end with the frame $b^2$, as shown at $b^6$. The nut $b^5$ is provided with a slot or slots $b^7$ in its head, for insertion in and removal from working position. The adjusting rod $b^3$ is adapted to be operated by an ordinary wrench-headed key, not shown. It is obvious, that with this construction the horizontal tube $b$ may be accurately adjusted for its work of indicating the horizontal level.

Near the left end of the level is located the vertical or plumb line tube $c$, which is pivoted, as shown at $c'$ to base-piece $c^2$ removably secured to the body of the level by lag-screws $c^3$ or in any other suitable way. At its upper end, the vertical tube $c$ is subject to the cooperative action of a spring $c^4$ and a conical cam-headed rod $c^5$, both of which parts are seated in a removable cap $c^6$, secured by lag-screws $c^7$, or otherwise, in the body of the level. The spring $c^4$ is loose and is held from displacement where it bears on the tube by a lug $c^8$, projecting inside the spring from the tip of the tube. The upper end of the tube $c$ is beveled on the surface thereof opposite the spring $c^4$, as shown at $c^9$. The conical cam $c^5$ bears against the beveled surface $c^9$ and the stem of the cam-rod has screw-threaded engagement with the cap $c^6$, as shown at $c^{10}$, and is wrench headed at its upper end, for operation by the same key, which is applicable to operate the rod $b^4$, for the horizontal tube. The tube $c$ extends across the ordinary sight-opening $c^{11}$. With this construction, it is obvious, that the spring $c^4$ will tend to throw the top of the tube $c$ toward the right as far as permitted by the cam $c^5$, and that by turning the cam $c^5$ in its screw-threaded seat, the longitudinal movement thereof may be made to move the top of the tube $c$ toward the left against the spring $c^4$. Hence, by adjusting the said cam-rod or screw $c^5$, the vertical tube $c$ may be set as required, to indicate the plumb line.

Near the right end of the level is located a tube $d$ capable of endwise rotary motion, and therefore applicable to indicate angles or angular projections, with respect to the horizontal plane. As shown, the tube $d$ is carried in an annulus $d'$, mounted with freedom for rotary motion in a suitable case $d^2$, secured to the body of the level. The annulus $d'$ has cut on its periphery worm gear teeth $d^3$, which are engaged by a worm $d^4$ on wrench-headed adjusting rod $d^5$. The rod $d^5$ bears at its lower end against a suitable seat $d^6$ in the case $d^2$, and is held against upward longitudinal movement by a counterbored nut $d^7$, having screw-threaded engagement with the case $d^2$, as shown at $d^8$. The face of the annulus is graduated to indicate circular measure, as clearly shown in Figs. 1 and 3, and moves by a fixed pointer or indicating mark $d^9$, on the case $d^2$. The graduations on the face of the annulus $d'$, are arranged so that when the tube $d$ is horizontal, the zero mark on the dial plate or annulus $d'$ will be directly under the pointer or indicator mark $d^9$; and hence, whenever the tube is rotated endwise in either direction therefrom, the angle or angular projection may be at once read from the number of degrees indicated on the dial opposite the pointer $d^9$. The head of the adjusting rod $d^5$ is adapted for operation by the same key used for the rod $b^4$ and the cam-screw $c^5$. With this construction and mounting of the tube $d$, it is obvious that it may be rotated at will, in its seat and be set, so as to indicate any angular projection desired, with respect to the horizontal plane. In other words, when the tube $d$ is set for the desired angle, the bubble therein will be read at the sight opening and the tube be in the horizontal position, when the body of the level is set at the required angular projection. This device for indicating angles and angular projections is a great convenience in a level, for masons', carpenters' and other artisans' use. This angle tube $d$ is the most important feature of my invention. The nut $d^7$ is provided with slots $d^{10}$ for the application of a screw-driver, in the same way as the nut $b^5$.

The face of the beveled surface $c^9$ on the upper end of the plumb line tube $c$ is concave in cross section, as shown in Fig. 5; and, hence, the conical cam $c^5$ will hold the tube central therewith.

What I claim and desire to secure by Letters Patent of the United States, is as follows:

1. In a level, the combination with the bubble tube $d$, annulus $d'$, case $d^2$, gear-teeth $d^3$ and the worm $d^4$ of the rod $d^5$ seated in the case $d^2$, and the nut $d^7$, all arranged and operating substantially as described.

2. In a level, the combination with the pivoted tube $c$, having the lug $c^8$ and the beveled surface $c^9$, of the spring $c^4$, conical-headed cam-screw $c^5$, and the cap $c^6$, all arranged and operating substantially as described.

3. In a level, the combination with the horizontal leveling bubble-tube $b$, pivoted at one end, of the adjusting rod $b^3$, having screw threaded engagement with the free end of said tube $b$, and held against longitudinal movement by the nut $b^6$, substantially as described.

4. In a level, the combination with the bubble tube, of a rotary screw or worm, for adjusting the same, and a counterbored nut, having screw-threaded engagement with some fixed part of the level, for holding the rod against longitudinal movement, substantially as described.

In testimony whereof I affix my signature in presence of two witnesses.

JACOB HABEL.

Witnesses:
JOSIE HABEL,
JAS. F. WILLIAMSON.